United States Patent
Kunihiro et al.

[11] Patent Number: 5,915,228
[45] Date of Patent: Jun. 22, 1999

[54] TERMINAL APPARATUS, RADIO COMMUNICATION TERMINAL, AND INFORMATION INPUT METHOD

[75] Inventors: Takushi Kunihiro; Fukuharu Sudo, both of Tokyo, Japan

[73] Assignee: Sony Corporation, Tokyo, Japan

[21] Appl. No.: 08/683,966

[22] Filed: Jul. 22, 1996

[30] Foreign Application Priority Data

Jul. 21, 1995 [JP] Japan ................................ P07-207716

[51] Int. Cl.⁶ ..................................................... H04B 1/38
[52] U.S. Cl. .......................... 455/575; 455/90; 455/566; 340/710
[58] Field of Search ..................................... 455/566, 575, 455/90, 154.1, 158.4, 158.5; 379/367, 368; 345/163, 167, 168, 169, 184; 463/37; 273/148 B; 340/710

[56] References Cited

U.S. PATENT DOCUMENTS

| | | | |
|---|---|---|---|
| 5,237,311 | 8/1993 | Mailey et al. | 340/710 |
| 5,305,374 | 4/1994 | Snyder | 379/67 |
| 5,436,954 | 7/1995 | Nishiyama et al. | 455/566 |
| 5,627,531 | 5/1997 | Posso et al. | 345/184 |
| 5,715,524 | 2/1998 | Jambhekar et al. | 455/90 |

*Primary Examiner*—Reinhard J. Eisenzopf
*Assistant Examiner*—Sam Bhattacharya
*Attorney, Agent, or Firm*—Jay H. Maioli

[57] ABSTRACT

A terminal apparatus having a display used for displaying information and a memory used for storing the information, an input device, having a specific operation unit which is operable in two different directions, for detecting the physical moving direction of the specific operation unit, and a control element for switching a letter or a symbol to be displayed on the display based on the detected result of the input device in the letter input mode, or for determining the input.

14 Claims, 6 Drawing Sheets

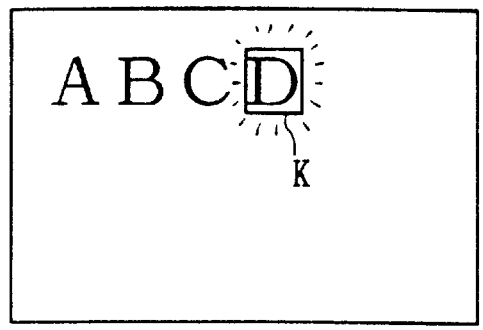
FIG. 5
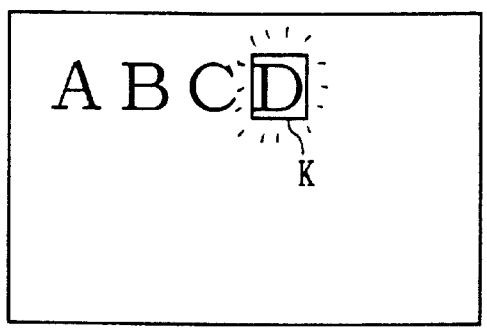 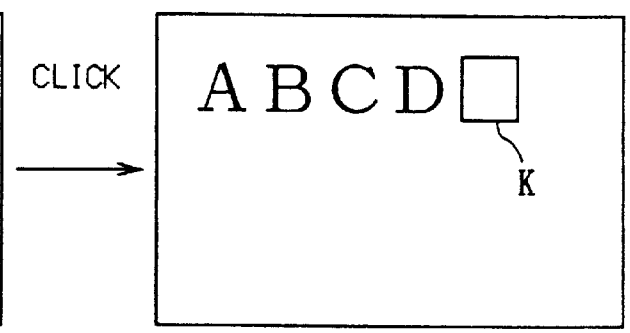
FIG. 6A      FIG. 6B
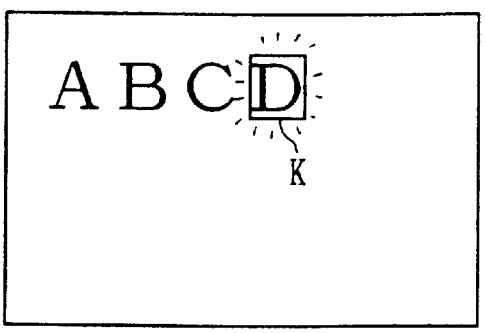 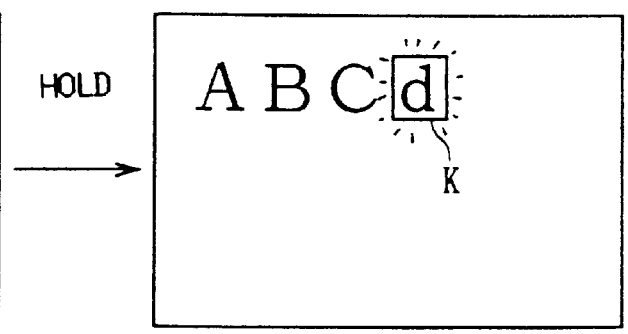
FIG. 7A      FIG. 7B 5,915,228

TERMINAL APPARATUS, RADIO COMMUNICATION TERMINAL, AND INFORMATION INPUT METHOD

FIELD OF THE INVENTION

The present invention relates to a terminal apparatus, a radio communication terminal, and an information input method, and more particularly, is applicable to a portable telephone

BACKGROUND OF THE INVENTION

Nowadays, some portable telephones are provided with a function that is able to call directly to the other party from the display of a telephone book list in which telephone numbers and names of other parties have been registered, namely, a telephone book list function. Generally, an input device such as a ten-key keypad has been used for entering information to this telephone book list.

By the way, a portable telephone progressing in miniaturization and light-weight is running short of even a space for mounting an input device such as a 10-ten key keypad. Therefore, it is required to realize an input device which can manage with less mounting space

SUMMARY OF THE INVENTION

In view of the foregoing, an object of this invention is to provide a terminal apparatus having an input device which can manage with less mounting space than that of a conventional one.

Another object of the invention is to provide a radio communication terminal and an information input method.

The foregoing object and other objects of the invention have been achieved by the provision of a terminal apparatus comprising: an operation means being operable in a plane parallel to a surface plane of a body and operably in a plan perpendicular to the surface plane of the body; a control means for processing information entered by the operation means; and a display means for displaying the information processed by the control means.

Further, this invention provides a radio communication terminal comprising: an antenna for emitting and gathering radio wave; a transmitting means for transmitting; a receiving means for receiving; an operation means being operable nearly parallel to a surface plane of a body and nearly perpendicular the surface plane of the body; a control means for processing an information entered by the operation means; and a display means for displaying information processed by the control means.

Further, this invention provides an information input method with plural modes comprising a first step for showing a candidate character to input ahead of the character being shown at present; a second step for showing a candidate character to input a character behind the character being shown at present; a third step for changing the input mode, and a fourth step for an entered character.

The nature, principle and utility of the invention will become more apparent from the following detailed description when read in conjunction with the accompanying drawings in which like parts are designated by like reference numerals or characters

BRIEF DESCRIPTION OF THE DRAWINGS

In the accompanying drawings:

FIG. 5 is a schematic diagram showing an example of a display screen;

FIGS. 6A and 6B are a schematic diagram showing an example of a display screen to be displayed when an inputted character is determined;

FIGS. 7A and 7B are a schematic diagram showing an example of a display screen to be displayed when an input mode is switched;

DETAILED DESCRIPTION OF THE EMBODIMENT

Preferred embodiments of this invention will be described with reference to the accompanying drawings:

(1) General Construction

Figure 1A:
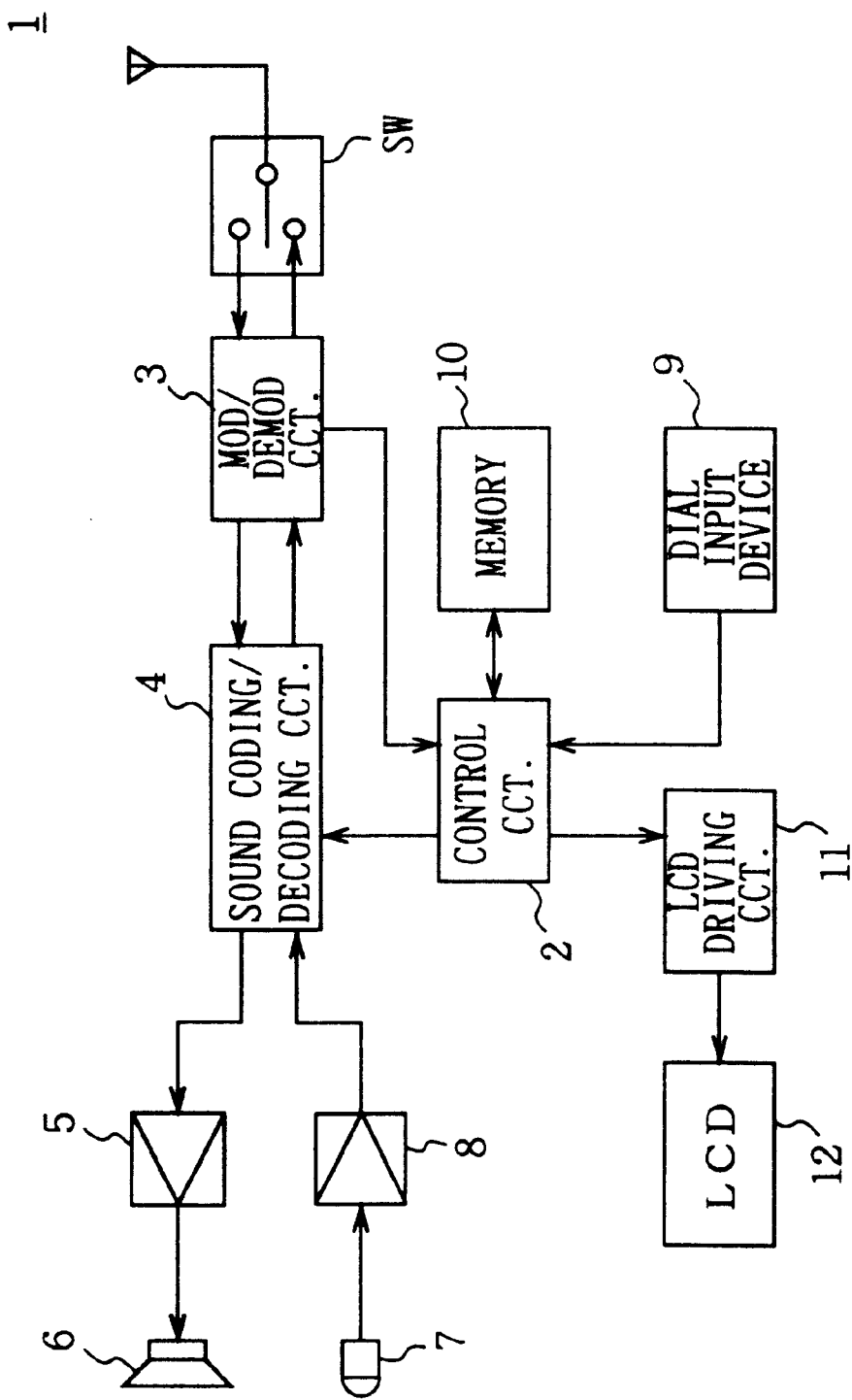
FIGS. 1A and 1B are a block diagram and a whole view showing an example of a terminal apparatus according to the present invention.
Figure 1:
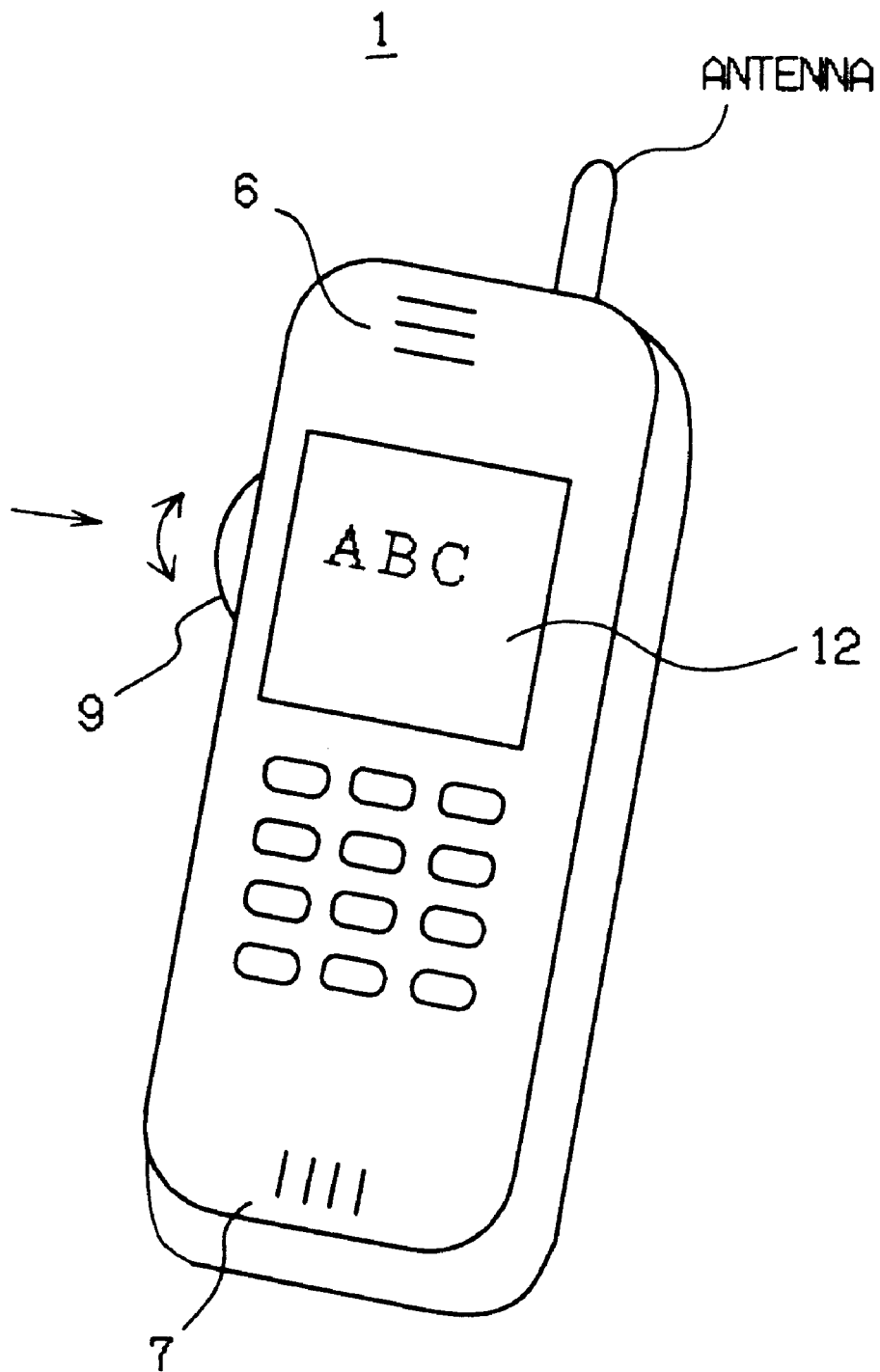

FIG. 1A shows a portable telephone 1 as an example of a terminal apparatus according to the invention The portable telephone 1 shown in this embodiment is characterized in using movable dial device as an input device. First, the general construction of the portable telephone 1 will be described The portable telephone 1 is constructed so that a control circuit 2 is at the center. The control circuit 2 has a microprocessor structure and controls internal devices such as a modulating/demodulating circuit 3 and a sound coding/decoding circuit 4.

When receiving signals, the modulating/demodulating circuit 3 operates to input a signal of the radio frequency band which has been received by an antenna via a switch SW, and output the demodulated signal to the sound coding/decoding circuit 4. At this time, the sound coding/decoding circuit 4 decodes the demodulated signal into a sound signal and outputs it to a speaker 6 via an amplifier 5.

When transmitting signals, the sound coding/decoding circuit 4 operates to code the sound signal which has been inputted via a microphone 7 and an amplifier 8 and to output it to the modulating/demodulating circuit 3. At this time, the modulating/demodulating circuit 3 modulates the inputted sound signal into a signal of the radio frequency band and transmits it via the switch SW and the antenna.

Note that, in the portable telephone 1, an electronic mail function to transmit and receive comparatively short sentences is provided in addition to a function to register telephone numbers and names of other parties in the telephone book. A dial input device 9 is used to input letters and numerals on executing these functions. FIG. 1B shows a rough sketch of the whole configuration of the portable telephone 1.

Figure 2:
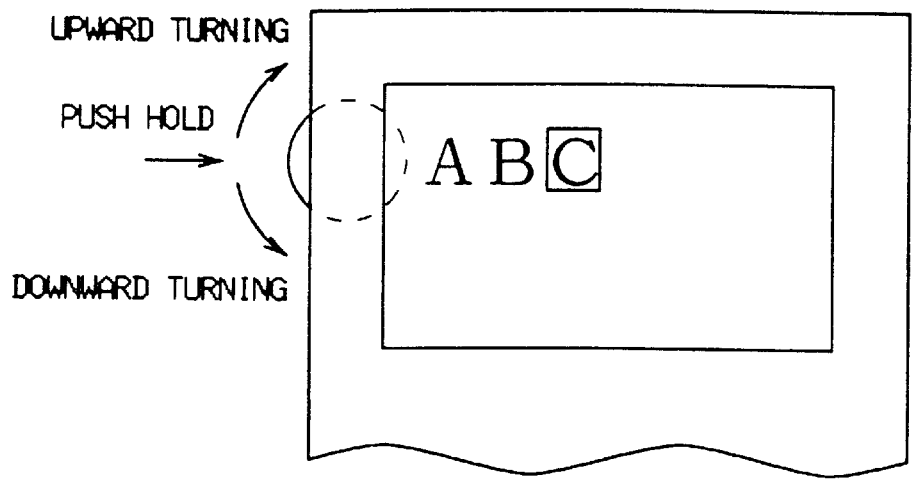
FIG. 2 is a schematic diagram explaining a dial input device.

The dial input device 9 is an input device that allows the rotational upward and downward turning operation and a push operation in the horizontal direction, as shown in FIG. 2.

A user can change an alphabet displayed on a screen by turning the dial input device 9 upward and downward, and also can determine the input of the alphabet displayed on the screen by pushing the dial input device 9 into the body of the telephone. In this connection, the user can change an operation mode of the portable telephone 1 by pushing and holding in the dial input device 9 for a long time.

A memory 10 stores data of letters or the like, which has been inputted by means of the dial input device 9 as the above manner. The memory 10 also stores other information, such as a control program and management data other than the letter inputted by the user.

The data stored in the memory 10 is read out at a suitable time by the control circuit 2 and displayed on the screen of a LCD device 12 via an LCD driving circuit 11. Note that, in the user input mode, alphabets "A, B, C, . . . Z" and "a, b, c, . . . z" are displayed in this order, and moreover, symbols representing "return to the preceding letter" and "end of inputting" are displayed following these alphabets.

(2) Structure of Dial Input Device

Figure 3:
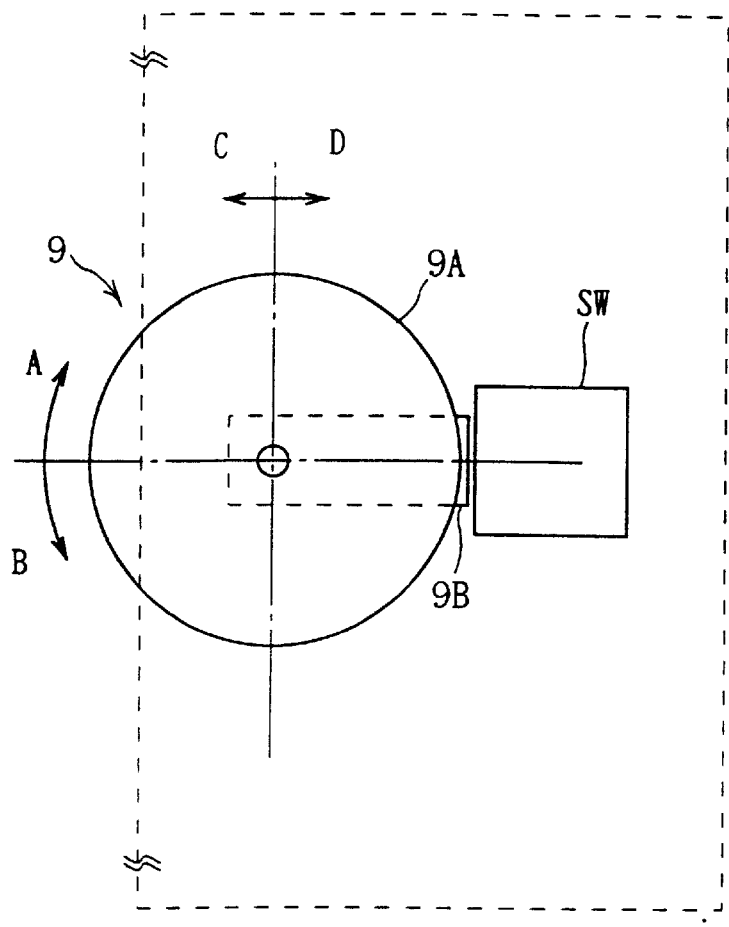
FIG. 3 is a schematic diagram showing the summary structure of the dial input device.

FIG. 3 shows the detailed structure of the dial input device 9. The dial input device 9 is composed of a rotary encoder 9A and a switch SW. Here, the rotary encoder 9A has the structure that two discs whose respective surfaces are formed with electrode patterns facing to each other are attached to a slide board 9B, and that the rotary encoder 9A rotates freely Further, the slide board 9B is pushed out toward the outside which is shown by an arrow "c" owing to the force of a spring, not shown, so that the slide board 9B slides into the body to close the electrode of the switch SW only when the user pushes the dial input device 9 in the radial direction.

In this connection, the rotary encoder 9A is used to detect the turned direction and the amount of turning of the dial, and the switch SW is used to detect the dial push in the horizontal direction.

In this embodiment, in a letter input mode, if the dial input device 9 is turned upward in this figure, the control circuit 2 changes the alphabet being displayed at the cursor position of the LCD device 12 in alphabetical order. Whereas, on the contrary, if the dial input device 9 is turned downward in this figure, the control circuit 2 changes the alphabet displayed at the cursor position of the LCD device 12 in the inverse alphabetical order.

Also, in the embodiment, if the dial input device 9 is pushed for a short time only once (namely, clicking), the control circuit 2 determines the inputted letter displayed on the LCD device 12. In this connection, when the letter inputted by this clicking operation is a symbol representing "return to the preceding letter", the control circuit 2 directs the LCD driving circuit 11 to return the cursor position displayed on the LCD device 12 to the position of one preceding letter. By this operation, the user can correct the inputted letter and can input a sequence of letters such as message and name.

Further, when a symbol representing "end of inputting" is inputted by the clicking operation, the control circuit 2 terminates the user input mode and proceeds to a mode selecting display.

On the other hand, when the dial input device 9 has been pushed for a long time (namely, hold), the control circuit 2 judges that change of the operation mode is directed.

For example, if the user pushes the dial input device 9 for a long time in the letter input mode, an alphabet at the cursor position to be displayed on the screen is changed from a capital letter to a small letter or from a small letter to a capital letter.

(3) Judging Procedure of Control Circuit in the User Input Mode

Figure 4:
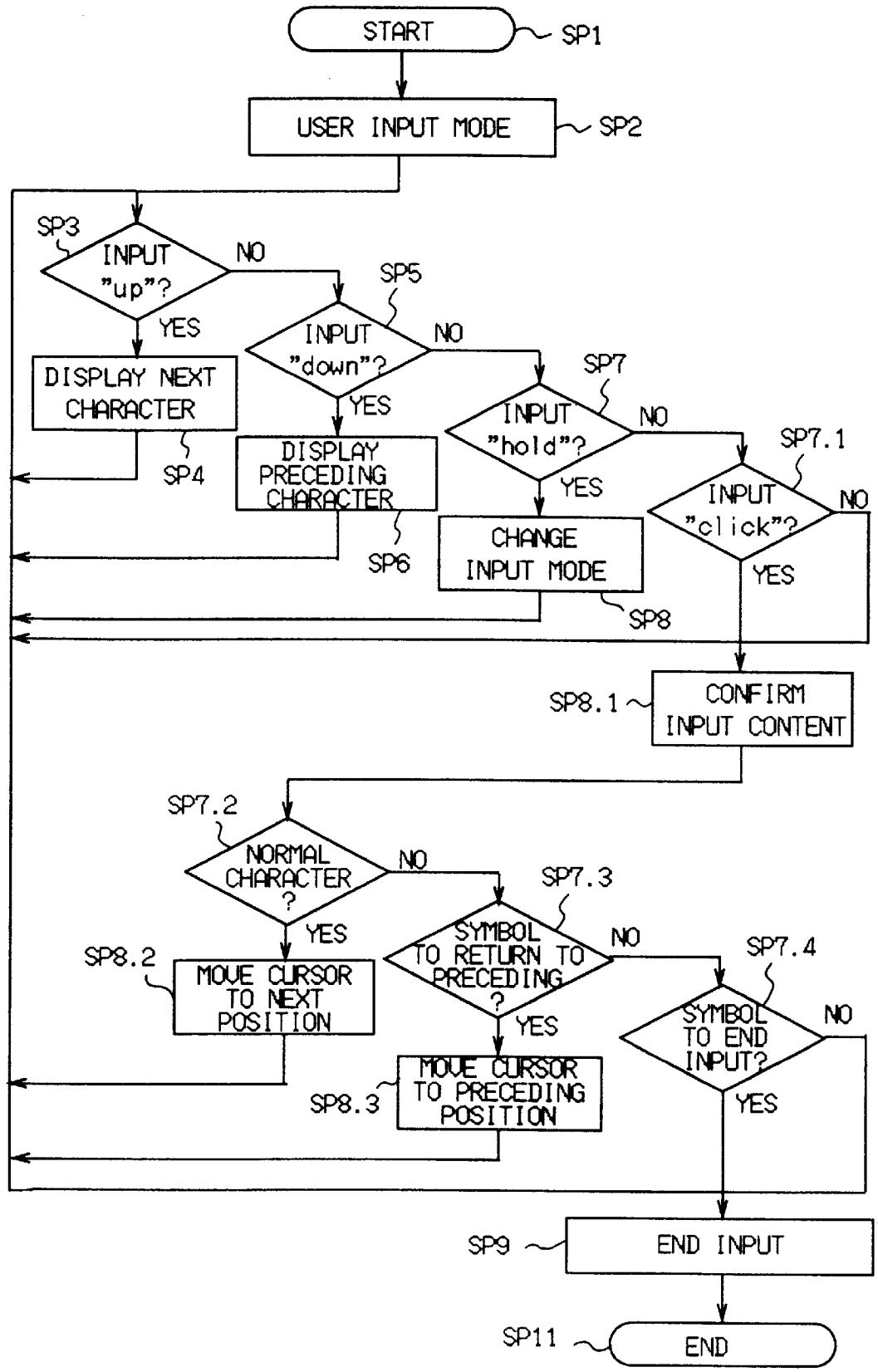
FIG. 4 is a flow chart showing the control procedure of a control circuit executed in a user input mode.

FIG. 4 shows the judging procedure of the control circuit 2 in the user input mode. If the user input mode is selected on the screen of the LCD device 12, the control circuit 2 starts the processing from step SP1 and then proceeds to step SP2 to set the user input mode as an operation mode.

The control circuit 2 proceeds to step SP3 in this state to judge whether or not the operation which has been done with respect to the dial input device 9 is a turning operation in the upward direction ("up" operation), based on the output signals of the rotary encoder 9A and the switch SW.

Here if an affirmative result is obtained, the control circuit 2 proceeds to the processing of step SP4 to direct that the next character in regular order be displayed at the cursor position, and then returns to step SP3. At this time, if the operation mode is an alphabet input mode, A, B, C, . . . are sequentially displayed as characters, on the other hand, if it is a telephone number input mode, 1, 2, 3, . . . are sequentially displayed as characters.

On the contrary, if a negative result is obtained at step SP3, the control circuit 2 proceeds to the processing of step SP5 to judge whether or not the operation which has been done with respect to the dial input device 9 is a downward turning operation ("down" operation).

Here, if an affirmative result is obtained, the control circuit 2 proceeds to the processing of step SP6 to direct that the preceding character in regular order is displayed at the cursor position, and then returns to the processing of step SP3. At this time, if the operation mode is the alphabet input mode, Z, Y, X, . . . are sequentially displayed as characters, on the other hand, if it is the telephone number input mode, 0, 9, 8, . . . are sequentially displayed as characters.

If a negative result is also obtained at step SP5, the control circuit 2 proceeds to the processing of step SP7 to judge whether or not the operation which has been performed with respect to the dial input device 9 is pushing for a long time in the horizontal or inward direction (namely, "hold" operation).

Here, if an affirmative result is obtained, the processing proceeds to step SP8 to direct the control circuit 2 to change the input mode, and returns to step SP3. By this processing, the input mode of a letter to be inputted next is changed from the capital letter mode to the small letter mode.

Further, if a negative result is obtained at step SP7, the processing proceeds to step SP7.1 where it is judged whether or not the click mode is selected. If a negative result is obtained at step SP7.1, it is judged that there is not any input at all, and the processing returns to step SP3. If an affirmative result is obtained at step SP7.1, the processing proceeds to step SP8.1 where the content of inputted information is confirmed, and then proceeds to step SP7.2. If the content of information is a normal character (a capital or small alphabet, or numeral), the processing proceeds to step SP8.2 where the cursor is moved to the next position, and then returns to step SP3. If a negative result is obtained at step SP7.2, the processing proceeds to step SP7.3. If the content of the information is determined to be "the symbol of returning to a preceding position" described later, the processing proceeds to step SP8.3, and the cursor is moved to one preceding position and the processing returns to step SP3. If a negative result is obtained at step SP7.3, the processing proceeds to step SP7.4. If the content of information is not "a symbol of end input", the processing returns to step SP3 to check the input again because this operation is impossible in normal case and there is a possibility of malfunction due to noise, etc if an affirmative result is obtained at step SP7.4, the processing proceeds to step SP9 to terminate the input mode and proceeds to step SP11. In this way, the operation of inputting by user is performed.

(4) Example of Input operation

On the above structure, an example of alphabetically inputting information will be described.

For example, if the user would like to display "D" as a letter following these three letters "ABC" which have been inputted already, as shown in FIG. 5, the user turns the dial input device 9 toward the upward direction so that an alphabet displayed at the position of a cursor K is sequentially switched to "A"–"B"–"C" to display the letter "D" as a candidate character to be inputted At this time, "D" which is not determined yet by clicking the dial input device 9 is in a blinking state.

Here, if the user determines inputting by pushing the dial input device 9 in the horizontal direction for a short time (namely, clicking), the display screen of the LCD device 12 is switched from FIG. 6A to FIG. 6B and the cursor K is moved to the next position.

At this time, if the user would like to input the small letter "d" not the capital letter "D", the user changes the input mode by pushing the dial input device 9 for a long time (namely, holding).

Thereby, the letter displayed in a blinking state at the position of the cursor K is changed from the capital letter "D" shown in FIG. 7A to the small letter "d" shown in FIG. 7B. Thereafter, if the user would like to input that small letter, the user clicks the dial input device 9, on the contrary, if the user would like to input a capital letter, the user holds the dial input device 9 again.

In the case where the user would like to input again the large letter "D", the user turns the dial input device 9 upward or downward to display a symbol representing "return to the preceding letter" at the position of the cursor K.

Figure 8:
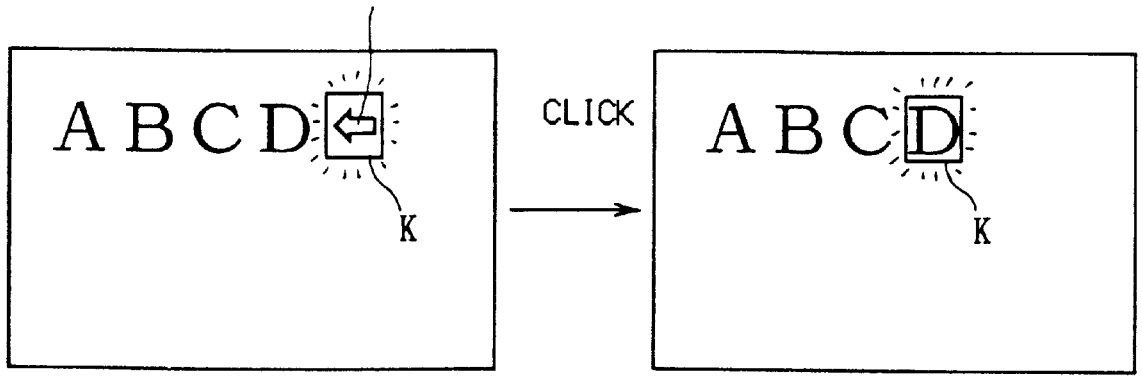
FIGS. 8A and 8B are schematic diagrams showing examples of a display screen to be displayed when the already determined character is corrected.

In case of this embodiment, the symbol representing "return to the preceding letter" has been prepared at the position after "Z", and so the user changes the inputting by turning the dial input device 9 until this symbol is displayed. The state where the symbol representing "return to the preceding letter" is displayed is shown in FIG. 8A. At this time, if the user clicks the dial input device 9, the position of the cursor K moves to the position of "D" which has been determined inputting, as shown in FIG. 8B.

Figure 9:
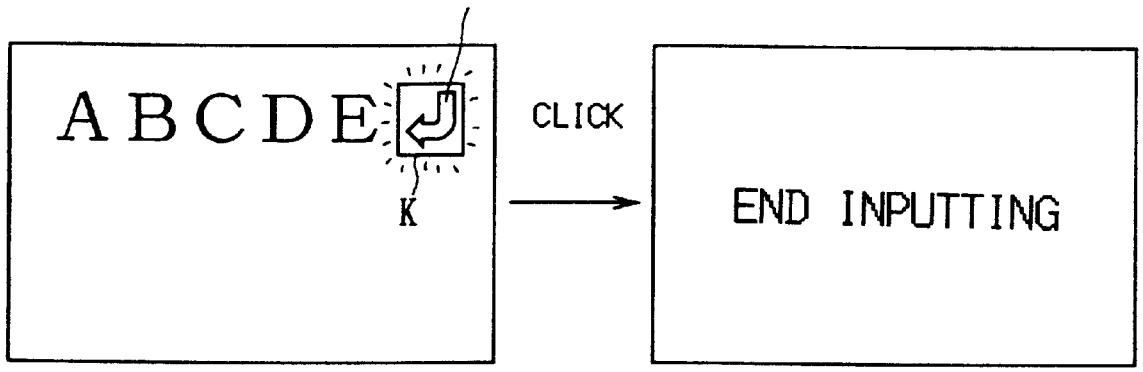
FIGS. 9A and 9B are schematic diagrams showing examples of a display screen to be displayed when the input mode is ended.

If the user would like to end the user input mode in the state where the inputting of "ABCDE" has been achieved by repeating the above operation, the user changes a character displayed at the position of the cursor K to a symbol representing "end inputting" by turning the dial input device 9 upward or downward, as shown in FIG. 9A.

In this situation, if the user clicks the dial input device 9, the screen changes into an input and screen as shown in FIG. 9B.

According to the above structure, it is able to realize a portable telephone in which the user can input characters only by turning upward or downward or pushing the dial input device 9. Thereby, a portable telephone 1 with a small body and without an input unit such as a ten-key keypad can be realized.

Furthermore, in case of using this dial input device 9, the user's usability can be improved because it is able to be operated with one finger while holding the body with one hand.

(5) Other Embodiments

In the aforementioned embodiment, the case has been described where an alphabet is inputted with the dial input device 9 in the user input mode, however, the present invention is not limited to this, but is also applicable to the case of inputting the other characters such as a numeral, inputting a virtual name, and inputting characters in another language, such as French or German.

Also, in the aforementioned embodiments, it has been described in the case where if the change directed in the user input mode, the input of capital letters and small letters is changed, however, the present invention is not limited to this, but it is widely applicable to the case of changing a group of characters.

For example, it is also able to be used in changing the displayed group of English letters to French letters, to German letters, and to others.

Further, in the aforementioned embodiments, it has been described in the case where the dial input device is used as a means for inputting a characteristic sequence in the user input mode, however, the invention is not only limited to this, but may use the other equipment, which is an input device capable of selecting and determining a candidate to be called.

For example, the present invention is also applicable to an input device of some other system having an operating unit which is able to be used in both a turning operation and a pushing operation. For example, the input device provided with a mechanism in which the operating unit always returns to the neutral position when the user lets go his hand from the operating unit can be used.

Furthermore, in the aforementioned embodiments, it has been described in the case where a symbol of "return to the preceding character" shown in FIGS. 8A and 8B is used and a symbol of "end inputting" shown in FIGS. 9A and 9B is used, however, the invention is not limited only to this, but can use other shapes of symbols.

Also, in the aforementioned embodiments, it has been described about an LCD device as a display means, however, the invention is not limited to this, but can use other display means.

Furthermore, in the aforementioned embodiments, it has been described about a portable telephone as an example of a terminal apparatus, however, the present invention is not limited to this, but is also applicable to a communication terminal apparatus such as a portable information terminal (personal digital assist) for transmitting and receiving text data, a wired terminal apparatus, or the like.

As described above, according to the present invention, an input device having a specified operation unit which is operable in both ways and in two different operational directions, is used to input a letter or a symbol, so that a terminal apparatus in which the mounting space of an input device become extremely small can be realized.

While there has been described in connection with the preferred embodiments of the invention, it will be obvious to those skilled in the art that various changes and modifications may be made, therefore it is an object, to cover in the appended claims all such changes and modifications as fall within the true spirit and scope of the invention.

What is claimed is:

1. A terminal apparatus comprising:

a body having a planar surface;

operation means formed as a rotary dial arranged in a side wall of said body and being operable for rotational movement in a plane parallel to said planar surface of said body and for linear movement in said plane parallel to said planar surface of said body;

control means for processing information entered by said operation means; and display means arranged on said planar surface for displaying said information processed by said control means, wherein said control means includes means for recognizing directions of said rotational movement of said operation means to go ahead of and to go back of said information displayed on said display means, and also for recognizing a short term push of said linear movement of said operation means and a long term push of said linear movement of said operation means.

2. The terminal apparatus according to claim 1, wherein said dial comprises:
a rotary encoder operable for said rotational movement in said plane parallel to said planar surface; and
a switch operable for said linear movement in said plane parallel to said planar surface.

3. The terminal apparatus according to claim 1, wherein said dial comprises:
means providing a recovering force to move said dial to a default position for said rotational movement; and
a switch operable for said linear movement in said plane parallel to said planar surface.

4. The terminal apparatus according to claim 1, wherein said control means includes means for recognizing directions of said rotational movement of said operation means to go ahead of and to back of said information displayed on said display means and to recognize said linear movement of said operation means.

5. The terminal apparatus according to claim 4, wherein said direction to go ahead of and and back of correspond to pointing to go ahead of and to back of in a predetermined order to a predetermined group of data.

6. The terminal apparatus according to claim 5, wherein said predetermined order is alphabetical order.

7. The terminal apparatus according to claim 1, wherein:
one of said short term push and said long term push corresponds to an enter operation of said control means and
the other of said short term push and said long term push corresponds to a changing mode operation of said control means.

8. The terminal apparatus according to claim 7, wherein said changing mode operation corresponds to one of changing capital letters to small letters and changing small letters to capital letters.

9. The terminal apparatus according to claim 7, wherein said changing mode operation corresponds to changing languages of said information displayed on said display means.

10. A radio communication terminal comprising:
a body having a planar surface;
an antenna mounted on said body;
transmitting means for transmitting radio waves using said antenna;
receiving means for receiving radio waves using said antenna;
an operation means formed as a rotary dial arranged in a side wall of said body and being operable for rotational movement in a plane parallel to said planar surface of said body and for linear movement in said plane parallel to said planar surface of said body;
control means for processing information entered by said operation means; and
display means arranged on said planar surface for displaying said information processed by said control means, wherein
said control means includes means for recognizing directions of said rotational movement to go ahead of and to go back of said information displayed on said display means, and also for recognizing a short term push of said linear movement of said operation means and a long term push of said linear movement of said operation means.

11. The radio communication terminal according to claim 10, wherein
said operation means comprises:
a rotary encoder operable by said dial for said operation to rotational movement in said plane parallel direction parallel to said planar surface; and
a switch operable by said dial for said linear movement in said plane parallel to said planar surface.

12. The radio communication terminal according to claim 10, wherein
said control means includes means for recognizing directions of said rotational movement to go a head of and to back of said, information display on said display means, wherein:
said directions to go ahead of and to back of correspond to pointing to go ahead of and to back of in a predetermined order of a predetermined group of data.

13. An information input method for an apparatus having a body with a planar surface and an input device with a plurality of input modes comprising:
a first step of displaying a candidate input character that is ahead of a character being displayed at present;
a second step of displaying a candidate input character that is behind a character being displayed at present;
a third step of changing an input mode; and
a fourth step of confirming a character entered in one of said first step and said second step, wherein
one of said first, second, third, and fourth steps is executed by a rotary movement operation of the input device in a plane parallel to said planar surface of said body;
the other one of said first, second third, and fourth steps is executed by a linear movement operation of the input device in said plane parallel to said planar surface of said body;
said linear movement operation corresponds to one of an operation of a short term push and an operation of a long term push.

14. The information input method with plural modes according to claim 13, further comprising the steps of:
entering information using said input device;
if a content of said entered information is a back-space code, then performing a back-space operation after said first, second, third, and fourth steps are executed; and
if a content of said entered information is an input-end code, then performing an input-end operation after said first, second, third, and fourth steps are executed.

* * * * *